(12) United States Patent
Bourlier et al.

(10) Patent No.: US 6,500,516 B2
(45) Date of Patent: Dec. 31, 2002

(54) LIGHT TRANSMITTING PANELS

(76) Inventors: Emmanuelle Bourlier, 710 Pier Ave., Suite 3, Santa Monica, CA (US) 90405; Christian B. Mitman, 234 Thompson St., New York, NY (US) 10012

(*) Notice: Subject to any disclaimer, the term of this patent is extended or adjusted under 35 U.S.C. 154(b) by 0 days.

(21) Appl. No.: 09/773,500

(22) Filed: Feb. 2, 2001

(65) Prior Publication Data

US 2002/0106482 A1 Aug. 8, 2002

(51) Int. Cl.$^7$ .................................. B32B 3/12
(52) U.S. Cl. ............... 428/116; 428/73; 52/786.11; 52/786.13; 52/793.1; 156/99; 156/106; 156/307.1; 156/320
(58) Field of Search .................. 428/116, 117, 428/118, 73; 52/786.11, 786.13, 793.1, 793.11, 99, 106; 156/307.1, 311, 320, 321, 322

(56) References Cited

U.S. PATENT DOCUMENTS

| | | | |
|---|---|---|---|
| 2,785,286 A | 3/1957 | Lichtgarn .................. 240/2 |
| 2,828,235 A | * 3/1958 | Holland et al. | |
| 2,849,758 A | 9/1958 | Plumley et al. ............ 20/15 |
| 2,962,403 A | 11/1960 | Jones ..................... 154/45.9 |
| 2,981,382 A | 4/1961 | Keller ..................... 189/34 |
| 3,024,880 A | 3/1962 | Burmeister ............... 189/64 |
| 3,103,460 A | 9/1963 | Picket ..................... 161/69 |
| 3,193,434 A | 7/1965 | Weiss ..................... 161/6 |
| 3,276,177 A | 10/1966 | Keller ..................... 52/311 |
| 3,396,497 A | 8/1968 | Murphy ................... 52/80 |
| 4,076,877 A | 2/1978 | Tanzen .................... 428/73 |
| 4,249,976 A | * 2/1981 | Hudson | |
| 4,378,663 A | 4/1983 | Audet ..................... 52/580 |
| 4,453,367 A | 6/1984 | Geyer et al. .............. 82/806 |
| 4,749,601 A | 6/1988 | Hillinger ................. 428/73 |
| 4,902,365 A | 2/1990 | Westlake, Sr. ........... 156/273.9 |
| 4,931,340 A | 6/1990 | Baba et al. ............... 428/73 |
| 5,034,256 A | 7/1991 | Santiso, III et al. ...... 428/73 |
| 5,270,092 A | 12/1993 | Griffith et al. ........... 428/69 |
| 5,271,973 A | 12/1993 | Huether .................. 428/34 |
| 5,667,867 A | 9/1997 | Meier et al. ............. 428/116 |
| 5,888,610 A | 3/1999 | Fournier et al. ......... 428/116 |

FOREIGN PATENT DOCUMENTS

GB 2316651 A * 3/1998

* cited by examiner

Primary Examiner—Deborah Jones
Assistant Examiner—Wendy Boss

(57) ABSTRACT

This invention relates to methods of making visually uniform, light transmitting panels and to the resulting panels, which include a cellular core sandwiched between two light transmitting sheets and possess improved light transmitting characteristics.

17 Claims, 5 Drawing Sheets

LIGHT TRANSMITTING PANELS

FIELD OF THE INVENTION

This application relates to light transmitting panels useful in the architectural and design fields.

BACKGROUND OF THE INVENTION

Many applications in the architectural and other design fields benefit from visually uniform, rigid, lightweight, light-transmitting structural panels that can be utilized not only to divide space or provide support, but also to transmit or manipulate light and provide privacy. For example, light transmitting panels may be incorporated into furniture, exhibits, residential or office walls, fixed or movable partitions, ceiling panels, work surfaces, shelving, sign panels, light diffusers, flooring, roofing and the like.

There are a number of qualities which are desirable in such light transmitting panels. They are preferably visually uniform to provide the finished product with a high level of quality, but not unduly expensive to manufacture. In addition, they should provide characteristics comparable to those of conventional panels in terms of workability during on-site fabrication by the end user and architectural properties such as strength and stiffness.

Light transmitting panels comprising a light-weight honeycomb structure or other cellular structure, sandwiched between two light transmitting plastic sheets have been used in the past, but such prior panels have not possessed the combination of visual uniformity and structural performance of the present invention.

A major problem with prior light transmitting panels is the presence of fillets of glue (narrow areas of glue) which, because of past manufacturing techniques, tend to occur at places where the light transmitting sheet touches the edges of the cellular structure. The glue, not necessarily being perfectly transparent and having an index of refraction different from air, tends to prohibit, bend or deflect the flow of light. These fillets may be in the range of about 0.030 to 0.125 inches wide. Also using previous manufacturing techniques, the exact size and opacity of the fillet was difficult if not impossible to control due to the uneven migration of adhesive to the point of contact between the cell wall and face sheet. Liquid adhesives or adhesives that liquify during heating could tend in previous processes to run or drop to the lower face sheet due to gravity, resulting in larger fillets on one side of the panel. In addition, air trapped between an adhesive film and a translucent sheet can cause bubbles and other visual non-uniformities in a light transmitting panel. Previous methods of manufacture had a tendency to produce such defects, reducing the desirability and value of the panels in the architectural and design fields.

Another major problem occurring in current light transmitting panels, also due to manufacturing techniques that utilize adhesive films between the translucent sheet and the cellular structure, is the tendency of the film to separate from the sheet in areas between the edges of each cell. Because these separations alter the transmission and reflective properties of the panel, such panels have a visually non-uniform appearance.

While such non-uniformities may be acceptable for applications where panels do not transmit light, they are undesirable for panels in architectural and other design uses that transmit light and where visual consistency is important.

Methods of making honeycomb core panels have been known, but they have failed to provide the high degree of visual uniformity and other characteristics of the present invention. For example, Meier U.S. Pat. No. 5,667,867 relates to the use of two adhesive films, one applied to a sheet for an outer layer and one to a honeycomb core. The adhesive film on the core is treated to form droplets of adhesive at the edges of the cells of the core. The sheet and core are then brought into contact, and the droplets result in an adhesive contour, which is undesirable from the point of view of visual uniformity.

As another example, Fornier et al. U.S. Pat. No. 5,888,610 relates to using an adhesive film to bind a skin to a core, but the patent teaches heating the film to make the glue flow and bind the sheet to the core by forming a meniscus at the skin/core interface. Again, this flow and meniscus are undesirable in terms of visual uniformity of a light transmitting panel.

In another example, epoxy adhesive have been used to bind transparent sheets to cores. The epoxy has been applied to the sheet as a liquid and the core has been placed next to the sheet before the epoxy cures. In such cases, the liquid epoxy adhesive has flowed to areas of sheet/core contact, creating undesirable glue fillets.

As a final example, thermoplastic adhesive films have been merely placed between a translucent sheet and a honeycomb core, without first adhering the film to the sheet. This combination has then been heated above the flow temperature of the adhesive to bind the sheet to the core. The adhesive, however, has failed to adhere uniformly to the sheet, trapping air and causing bubbles and other visual non-uniformities. In addition, adhesive has migrated to areas of sheet/core contact, causing glue fillets and failing to provide the visual uniformity and other desirable characteristics of the present invention.

SUMMARY OF THE INVENTION

A preferred method of manufacturing light transmitting panels according to the present invention makes it possible to minimize or preferably eliminate glue fillets, bubbles or other trapped air, and film separations and to provide for substantial increases in the uniform transmission and reflection of light. Panels of this invention preferably may also provide other improved properties and interesting visual effects, including (a) directional translucency, wherein the structure of the cellular core produces different degrees of translucency depending upon the line of sight of the viewer through the panel, (b) translucency in proportion to the distance of the viewer from the panel, and (c) an effect that may be referred to as pixelation. Pixelation is the visual effect produced by capturing within each individual cell of the panel the color, intensity and movement of the light directly behind that cell. When viewed in conjunction with other contiguous cells within the context of a large panel, this property of the panel produces a visual effect simulating that of a digitized image composed of individual points of color and light, i.e., pixels.

This invention also makes it possible to obtain improved visual uniformity; to utilize economical raw materials; and to achieve a final product which is easily handled as a building or construction material.

The present invention includes a process for manufacturing a visually uniform, light transmitting architectural panel which comprises at least one light transmitting sheet, a film of adhesive, and a cellular structure. Typically, the cellular structure is a honeycomb panel which is sandwiched between two light transmitting sheets. That assembly is held together by two adhesive films, one on each side of the honeycomb panel. The adhesive film is adhered to the light transmitting sheet and the cellular structure, preferably without creating glue fillets or otherwise substantially altering the thickness of the film in large areas. This invention may be accomplished for example by using a heat sensitive adhesive film that has a flow temperature and heating the combination of sheet, film and cellular structure while in contact with each other to a temperature slightly below the flow temperature. Thereafter the temperature may be raised for a minimal time to above the flow temperature. As a result, the film does not alter its shape substantially, creates minimal or no glue fillets, results in little or no trapped air or bubbles, and does not have a significant tendency to separate from the sheet in areas that are not in contact with the edges of the cellular structure. Typically, the adhesive film initially has a uniform thickness which preferably it substantially retains throughout the manufacturing process.

In this manner a panel with a high degree of visual uniformity and/or a high degree of light transmission may be obtained. The panel may also possess novel or improved properties of pixelation, directional translucency and other desirable visual properties.

BRIEF DESCRIPTION OF THE DRAWINGS

Further details of the invention are revealed below by the illustrative, diagrammatic drawings, in which.

DETAILED DESCRIPTION OF THE INVENTION

Figure 1:
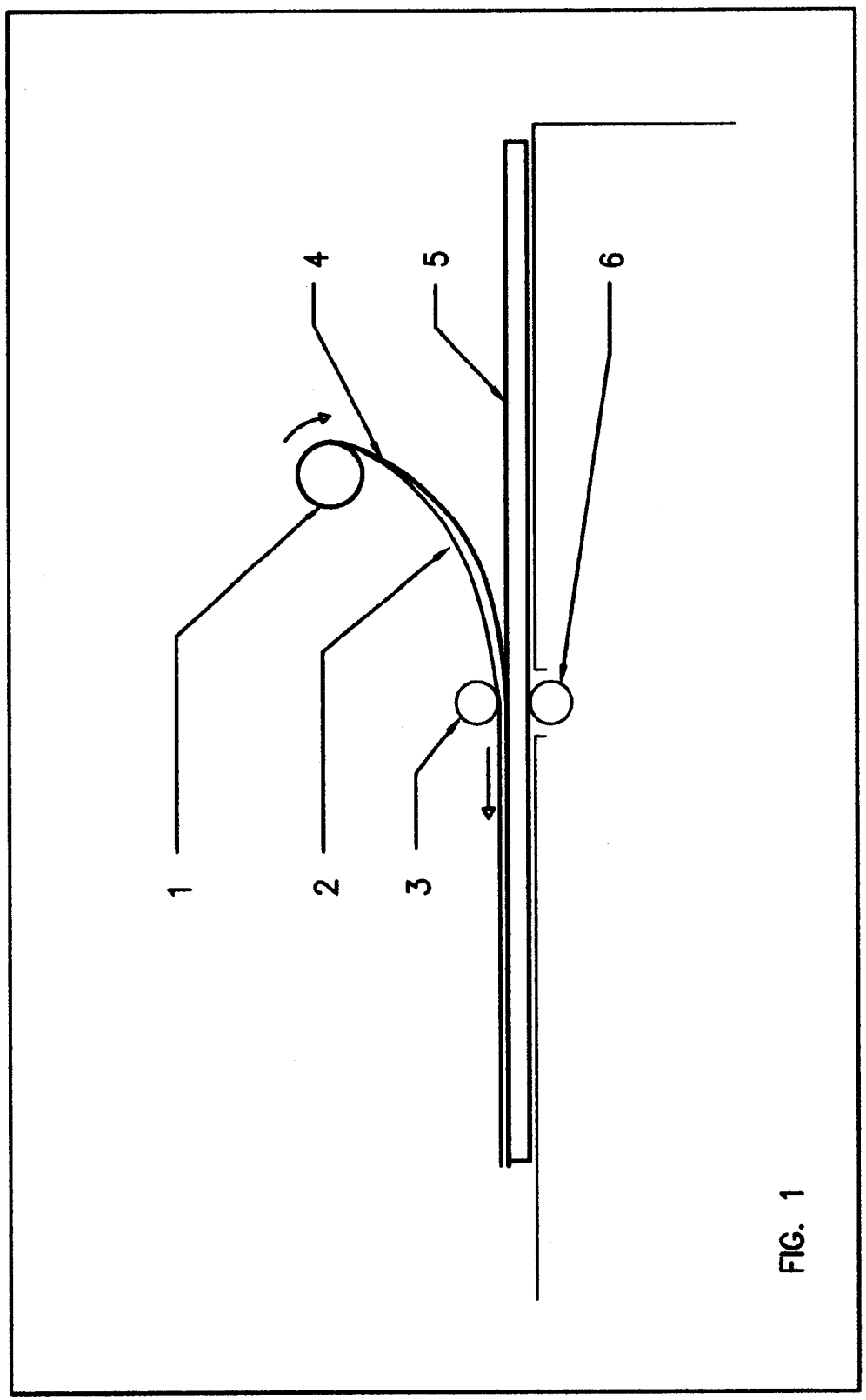
FIG. 1 shows a preferred method of pre-laminating the outer layer ("facing sheet") using a hot roll laminator.

The process according to the invention can be carried out with outer layers made from various materials. Examples of suitable materials are acrylic, polycarbonate, glass, fiberglass-reinforced polymer sheet, or other light transmitting sheet materials. Acrylic sheet can either be extruded or cell cast although it must behave within standard parameters known in the art of thermoplastic acrylic sheet. The glass may be tempered or untempered, clear, light transmitting, tinted, or it may be textured on one side. Polycarbonate and other polymer sheets and reinforced sheets may also be clear, tinted, or surface textured.

Preferred outer layers include those made from sheet material comprising extruded fiberglass-reinforced polyester with slightly visible glass fibers. The fibers add to the visual depth and texture of the material by providing an iridescent light transmitting effect. Such materials are economical, which is important in the architectural and large-scale construction industries. Preferred outer layers are untinted, but they may also be tinted or surface textured. In a preferred embodiment the outer layer material may be easily cut using standard woodworking methods, has a durable surface and resists scratching and marring. Preferably, the untrimmed finished panel should be at least ½" larger than the desired finished panel in the length and width dimensions in order to allow for trimming of the laminated panels to expose a clean, square edge.

The cellular structures may be composed of metals, for example: iron, steel, zinc, zinc-plated iron, tin, bronze, non-ferrous metals, copper, titanium or preferably aluminum, or alloys thereof. The metals used may be provided as foils, tapes or sheets. The cellular structures may also be made from other materials, including plastics, such as polycarbonates and other polymers, PMMA (polymethyl methacrylate), cellulose acetate, polypropylene, PET (polyethylene terephthalate) or the like. Preferred cellular structures of the present invention include tubular polycarbonate structures in various densities and cell sizes from 1.5 mm to 7 mm, and bonded ribbon polymer structures, specifically the core manufactured by Wacotech in various densities and cell sizes, e.g., from 4 mm to 14 mm. Preferred structures also include molded plastic structures. The cellular structures are more preferably made from aluminum or alloys thereof. The cellular structures preferably have a density of 3.3 pcf (pounds/cubic foot) and a thickness of 0.625 inches and a cell size of 0.375 inches, although other sizes and configurations are also contemplated by the present invention.

The cellular structures are, for example, bundles of individual cells. They may have the shape of tube bundles or honeycombs. The individual cells may have a regular shape, such as circular or polygonal cross-section, e.g., rectangular or hexagonal. The individual cells may also have irregular shapes or ribbon-like shapes. Preferred cellular structures are honeycombs having a hexagonal cross-section for each individual cell. Especially preferred cellular structures comprise aluminum honeycomb material with a wall thickness of about 0.0026 inches. The aluminum cellular structures of the present invention have numerous advantages over existing cellular structures composed of paper or cardboard honeycomb. Such paper structures have a wall thickness of 0.005 to 0.006 inches or approximately twice as thick as the metal or polycarbonate structures of the present invention.

Also, paper cores are generally sawed to the desired thickness, creating a frayed bonding surface, and being porous, absorb both adhesive and light, such that they do not possess reflective properties like those of preferred metallic and plastic cores. Such structures may be well suited for their intended uses, but are not suitable in the light transmitting panels of the present invention. A preferred cellular structure according to the invention is manufactured by Hexcel. Expandable honeycomb cores are preferably expanded in such a way as to produce very regular cell shapes. Such cores are referred to in the industry as "visual grade" core.

Suitable adhesives for use in the present invention may have a flow temperature, that is, a temperature at which the adhesive begins to melt and flow. Examples of preferred adhesive materials include clear urethane, polyester polyurethane, polyester (acrylic modified or other), polyolefins, polyethylenes and other thermoplastic and/or thermoset films. The adhesive film is preferably manufactured as a film and applied to the sheet as a film, but it may be applied to the sheet as a liquid to form a film in situ. The adhesive may be heat sensitive and pressure sensitive, or it may be either heat sensitive or pressure sensitive. For example, the aliphatic polyester polyurethane film Tecoflex AG8451, or AGKR, a reprocessed version of AG8451, both manufactured by Thermedics may be used, and acrylic modified polyester films manufactured by Bemis, Inc., may be used. The times and temperatures appropriate for any particular adhesive to achieve desired aspects can be determined by those skilled in the art based on the processes, examples and disclosures set forth herein.

The thickness of the adhesive film determines whether the cellular structure bonds sufficiently to the outer sheet, but too thick a film may tend to produce visually distorting glue fillets typically found in honeycomb panels constructed with liquid, reticulated or thicker film adhesives. The adhesive film may have a thickness of between 0.002 and 0.060 inches, a preferred thickness is between 0.004 and 0.006 inches. A most preferred adhesive is a 0.005 inches thick water clear thermoplastic urethane film adhesive provided in roll form, with a textured release liner on one side.

The liner protects the film and provides an embossed surface texture which allows for ease in handling.

The present invention may utilize a two step process wherein the outer layer or the outer layers can be adhered to the cellular structure after the adhesive film is adhered to the outer layer or layers. This two step process insures an intimate contact between the adhesive film and the outer layer.

Figure 4:
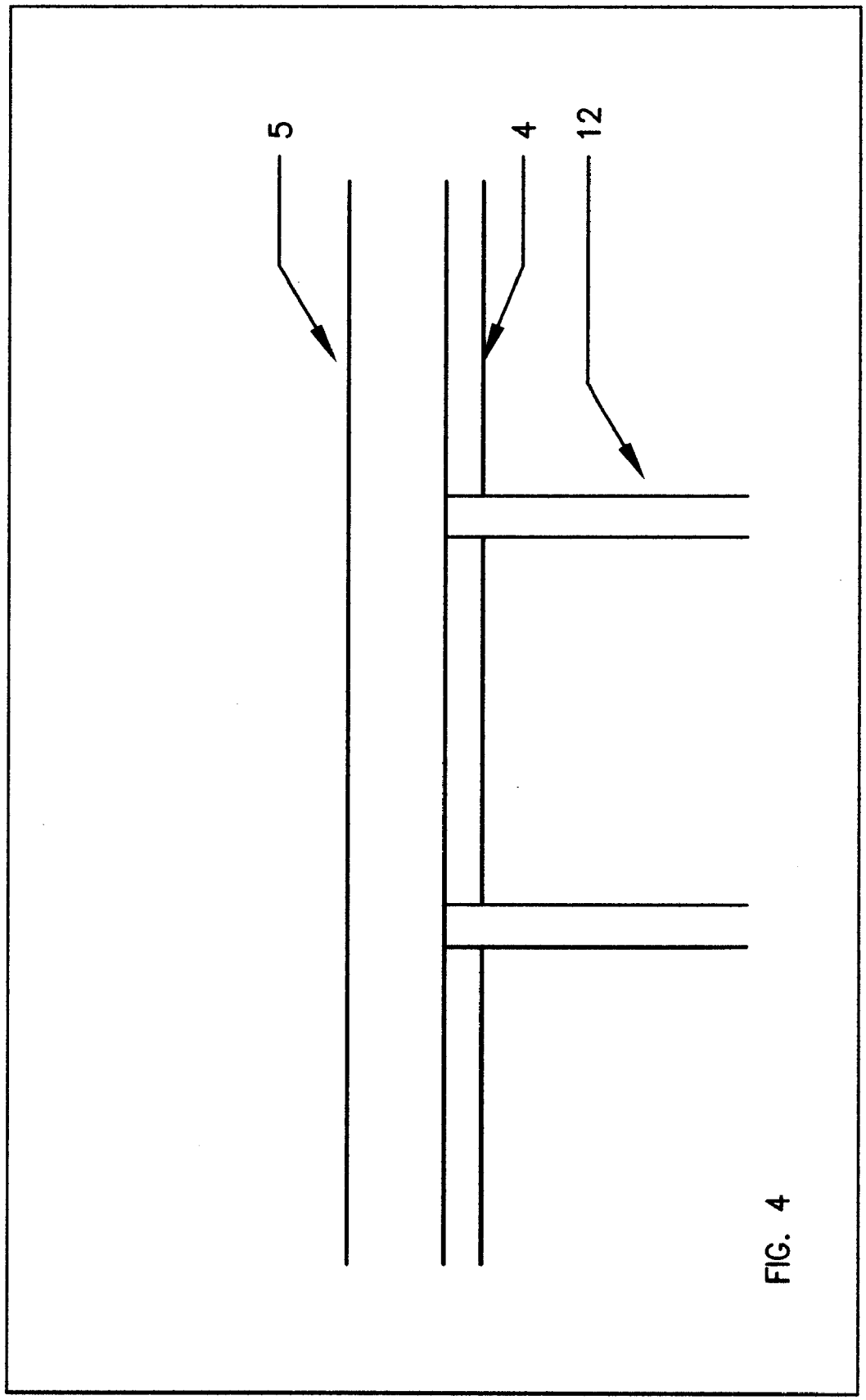
FIG. 4 shows the detail of a glue fillet section.
Figure 5:
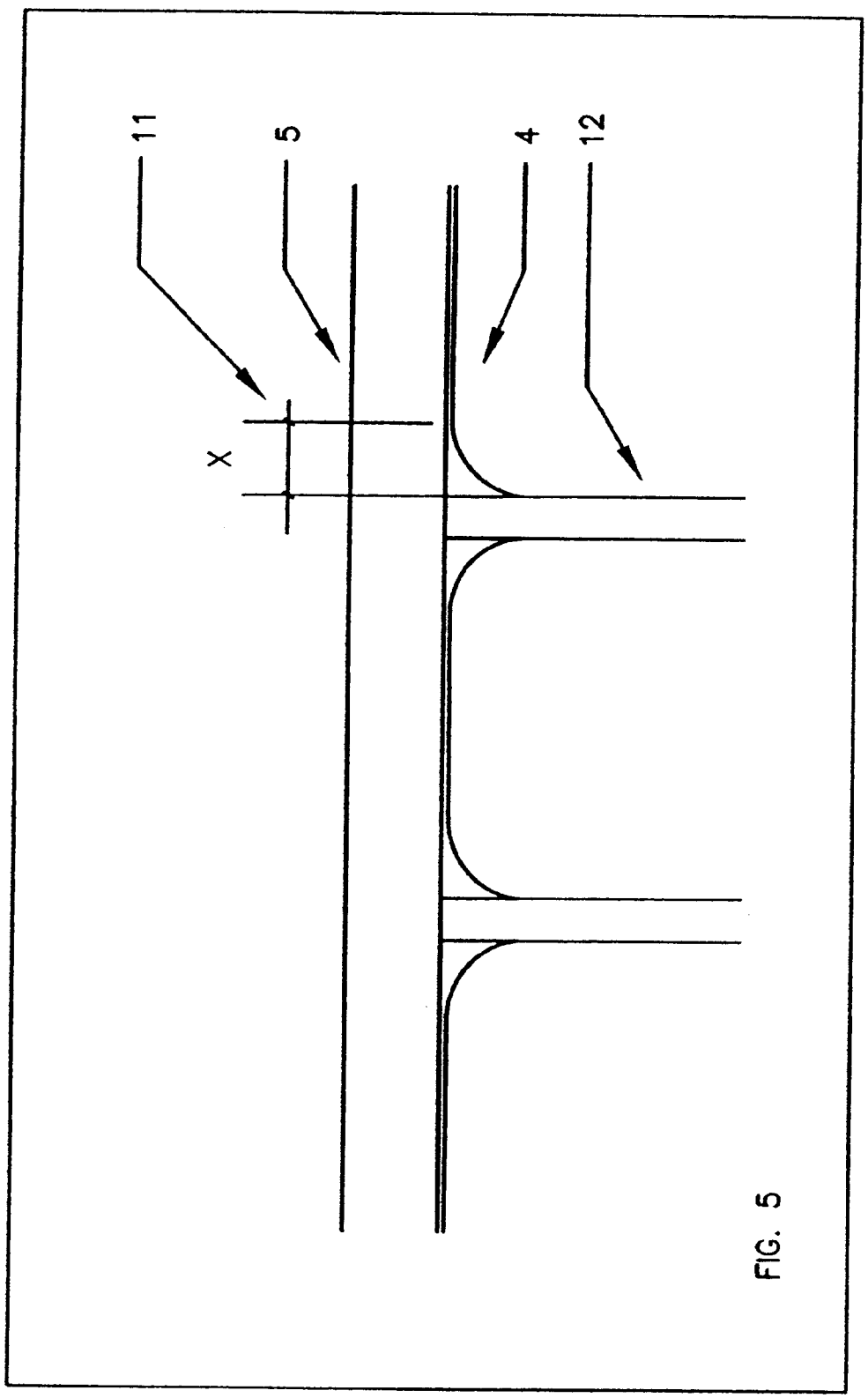
FIG. 5 shows the detail of a glue fillet section of the prior art.

In the prior art glue fillets of a structurally sound panel ranged from about 0.03 inches up to about 0.125 inches wide, measured from the edge of the cell to the area where the fillet returned to the level of the surrounding glue film or sheet face and ceased to alter the transmission of light through the panel (see X in FIG. 5), and they rose above the surface of the surrounding adhesive by up to about 0.03 inches In the present invention the width of glue fillets and other variations in the thickness of the glue film, if they exist at all, is preferably less than about 0.005 inches, and most preferably less than 0.001 inches or zero for practical purposes. See FIG. 4.

The compositions and processes of the present invention may be understood through the following examples, but these examples do not limit the present invention.

EXAMPLE 1
Prelamination of Adhesive with a Hot Roll Laminator

A light transmitting facing material with a protective film which can be removed immediately prior to handling is selected—Sequentia Product #75539 manufactured by Kemlite Company, Inc. This material is a 0.06 inch thick composite of fiberglass reinforcement in a plastic (polymer) matrix. The protective film provides a clean and unmarred surface to which the adhesive film can be laminated and also eliminates the need for additional labor and material costs associated with preparing the facing for pre-lamination. The facing is lightly cleaned with alcohol to ensure that no marks or debris are laminated onto the interior of the panel.

The adhesive film is 0.005 inches Tecoflex™ AG8451, manufactured by Thermedics Polymer Products, a division of Thermo Electron Corp., and composed of aliphatic polyetherurethane. This film has a melting point between 325 to 375° F. and 85–95% light transmission.

Referring to FIG. 1, the adhesive film 4 is set to unroll from the supply roll 1 onto one face of the outer layer 5 in a manner such that the adhesive does not touch the heated top roller 3 until the point of contact in order to prevent the film from reaching flow temperature prior to lamination. The film 4 is laminated to the outer layer 5 with release liner 2 interposed between the hot roller 3 and the film 4 and preferably with the aid of a second roller 6 which may be heated.

EXAMPLE 2
Vacuum Bagging Pre-lamination of Adhesive Film

Figure 2:
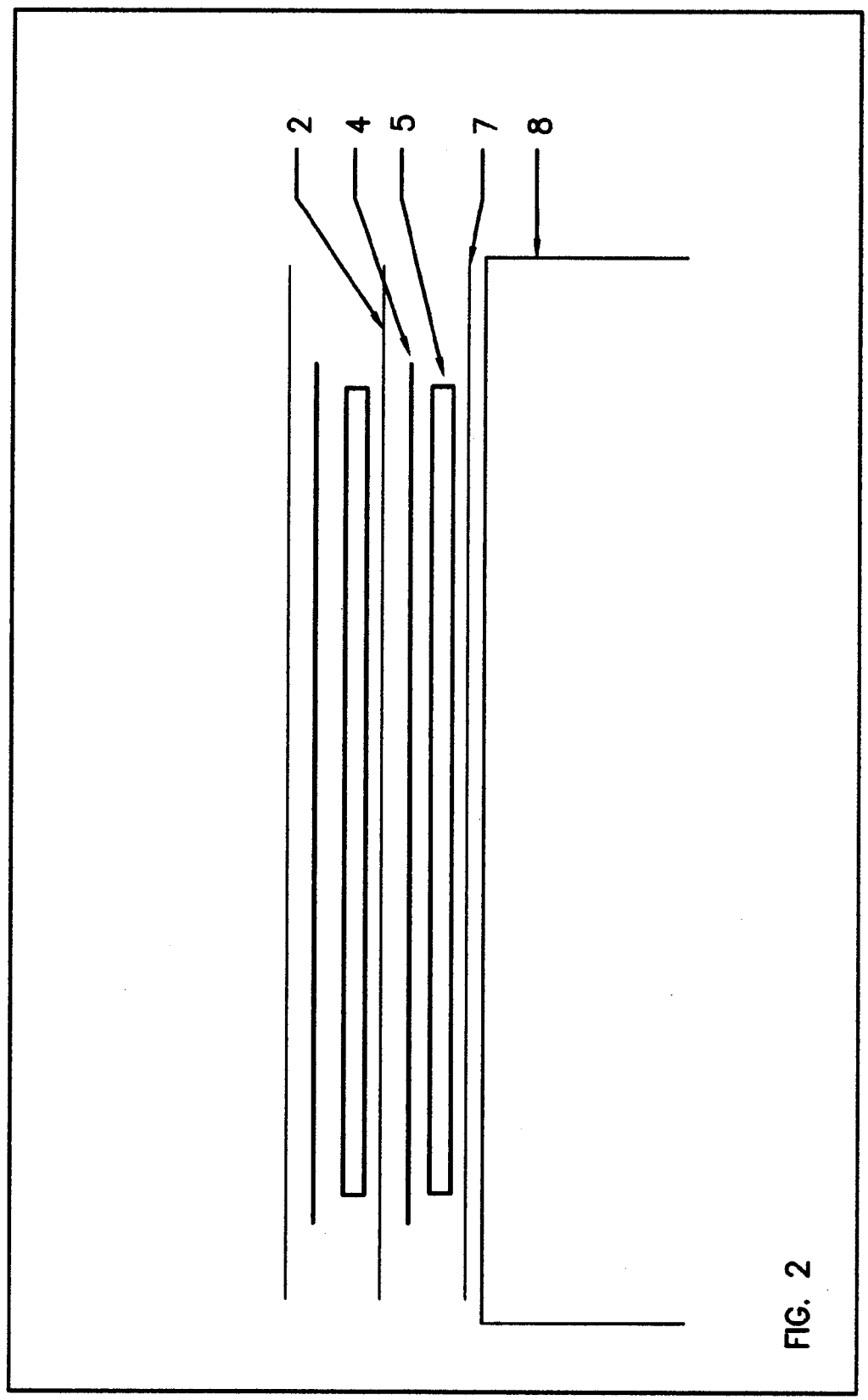
FIG. 2 shows an alternative method of pre-laminating the outer layers ("facing sheets") using an oven or autoclave.

An alternative to the hot roll lamination method of Example 1 is depicted in FIG. 2 and comprises the steps of:

a) laying an outer layer 5 and release film 7 facing down, on a flat surface such as a lay up table 8, which is at least 6 " larger than the outer layer on all sides;

b) laying an adhesive film 4 on the outer layer 5, using appropriate tension to ensure that it lays flat with no folds, wrinkles or uneven areas;

c) repeating steps a) and b) until approximately 20 outer layer/adhesive film layers have been stacked;

d) placing a bleeder cloth on top of the stack;

e) overlaying the stack with a vacuum bag and providing an air tight seal;

f) placing the stack in an oven under a minimum of 15 psi in order to adhere the films to the outer layer, and to eliminate air pockets;

g) cooling the stack while maintaining the vacuum until the outer layer returns to ambient temperature; and h) immediately before panel lay-up (in order to keep ambient debris and dust from contaminating the adhesive side of the layer), removing the release film from each pre-laminated outer layer.

In the oven step (f) the temperature is at or near the low point of the adhesive film's flow temperature [approximately 285° F.] so that the adhesive film does not completely liquefy but rather becomes clear and tacky, and it adheres to the outer layer. In this example, the temperature is maintained for approximately 1 hour per 1 " of stack height, although those skilled in the art will recognize that the time will vary with the temperature and materials used.

EXAMPLE 3
Preparing the Light Transmitting Panel

Figure 3:
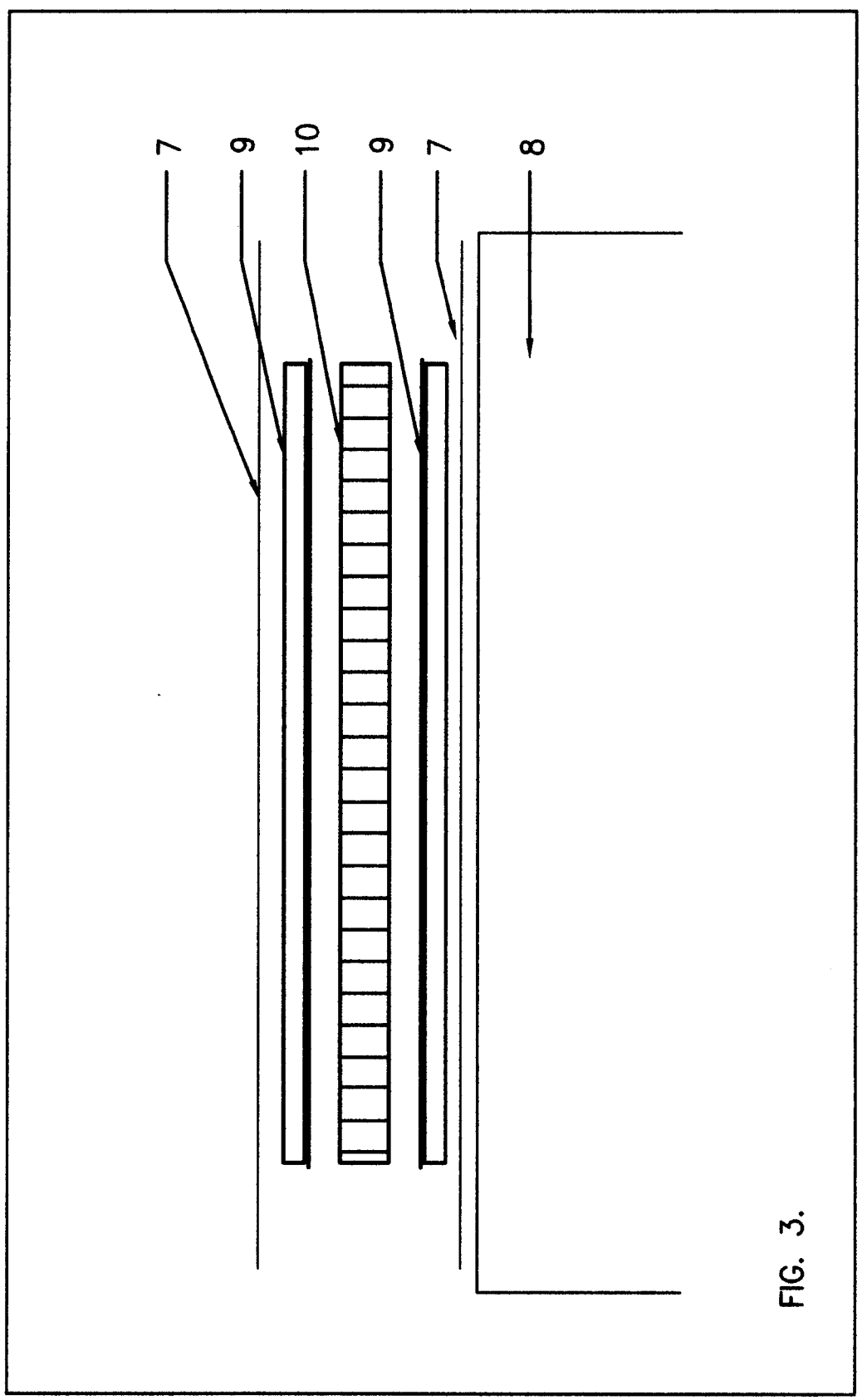
FIG. 3 shows a section through a panel lay up.

A light transmitting panel is prepared according to the following procedure as shown in FIG. 3:

a) laying release film 7 on a flat table 8;

b) placing a first outer layer 9 (its release film having been removed) with its adhered pre-laminated film adhesive face up on the release film 7;

c) placing a cellular structure 10 on the pre-laminated outer layer 9 so that direct contact between the adhesive film and the cellular structure is provided;

d) centering the structure on the pre-laminated outer layer such that the structure has approximately the same dimensions as the outer layer;

e) placing a second pre-laminated outer layer 9 (its release film having been removed) on the core 10 such that the adhesive film adhered to 9 is facing down and in direct contact with the structure and is aligned with the first outer layer;

f) placing a second layer of release film 7 on the second outer layer 9 on the side opposite the structure 10;

g) repeating steps b) to f) until the desired number of panels is reached, although it is preferable to provide no more than 10 to 15 inches high stack in order to insure an even heat distribution throughout the stack;

h) placing a bleeder cloth on top of the stack;

i) overlaying the stack with a vacuum bag and providing a seal;

j) placing the stack in an oven under a minimum pressure of 15 psi;

k) increasing the temperature in the oven slowly to 200° F. over a period of about 45 minutes;

l) increasing the oven temperature to 250° F., over a period of about 45 minutes, such that the entire stack of panels reaches a point approximately just below the flow temperature of the adhesive at approximately the same time;

m) increasing the temperature further to about 300° F. oven a period of about 45 minutes;

n) thereafter increasing the temperature further to 325° F., which is somewhat above the flow temperature, for about 30 minutes.

One skilled in the art will realize that the exact times and temperatures could vary from this example according to the performance characteristics of individual ovens and materials and may adjust them as necessary.

During the step (j), the pressure does not exceed a level which would deform the outer layer or the cellular structure materials. A thermocouple, for example the DPR 300 Digital Process Recorder by Honeywell, is used to insure accurate temperatures.

After the flow temperature is attained in the entire stack, the stack is removed from the heat and allowed to cool while being maintained under vacuum, until the entire stack reaches room temperature.

The vacuum bag is removed and a protective film applied to insure that the finished panels remain in good condition during trimming, shipping, on-site storage, on-site fabrication, installation, and the like.

It will be understood that other variations of the processes and components of the present may be used without deviating from the invention. For example, in place of ovens in the steps of prelaminating the adhesive film or preparing the panel, autoclaves or heated platens may be used, or an adhesive may be applied to a sheet in liquid form and then partially or fully cured or dried to form an adhesive film on the sheet.

We claim:

1. A process for manufacturing a visually uniform, light transmitting architectural panel comprising the steps of, providing a light transmitting sheet;

adhering one side of an adhesive film to the sheet;

adhering the other side of the film to a side of a cellular structure of sufficient thickness to provide architectural properties while maintaining the film in contact with the sheet and without substantially increasing the thickness of the film in the regions of contact with the cellular structure.

2. The process of claim 1 in which the adhesive film is pre-laminated to the light transmitting sheet, and thereafter that combination is adhered to the cellular structure.

3. The process of claim 1 in which the adhesive film is one or more of heat sensitive and pressure sensitive.

4. The process of claim 1 in which the adhesive film has a thickness of less than about 0.006 inches.

5. The process of claim 1 in which the adhesive film is provided by applying an adhesive in liquid form to the sheet and at least partially curing or drying the liquid to form a film adhering to the sheet.

6. The process of claim 1 in which the adhesive film comprises an acrylic modified polyester.

7. A process for manufacturing a visually uniform, light transmitting panel comprising the steps of, providing a light transmitting sheet;

providing an adhesive film having a flow temperature;

adhering the adhesive film to a side of the sheet;

placing a cellular structure against the adhesive film;

heating the entirety of the combination of sheet, film and structure to a temperature below the flow temperature of the film; and thereafter heating the combination to the flow temperature of the film without significantly exceeding the flow temperature of the film to adhere the film to a side of a cellular structure.

8. A visually uniform, light transmitting architectural panel comprising, a light transmitting sheet;

an adhesive film adhered uniformly to the sheet;

a cellular structure of sufficient thickness to provide architectural properties in contact with the adhesive film without substantial increases in thickness of the film in the areas of contact.

9. A visually uniform, light transmitting architectural panel comprising, a light transmitting sheet;

an adhesive film having a flow temperature uniformly adhered to the sheet; and a cellular structure of sufficient thickness to provide architectural properties adhered to said adhesive layer, wherein the film and sheet are in intimate contact and the adhesive film is substantially free of increases in thickness in the regions of contact with the cellular structure.

10. A panel formed by a process for manufacturing a visually uniform, light transmitting panel comprising the steps of, providing a light transmitting sheet;

providing an adhesive film having a flow temperature;

adhering the adhesive film to a side of the sheet;

placing a cellular structure against the adhesive film;

heating the entirety of the combination of sheet, film and structure to a temperature below the flow temperature of the film; and thereafter heating the combination to the flow of temperature of the film to adhere the film to a side of a cellular structure, in which the adhesive has formed glue fillets of less than about 0.005 inches in width.

11. A process for manufacturing a visually uniform, light transmitting panel comprising steps of:

providing a light transmitting sheet;

providing an adhesive film having a flow temperature;

adhering the adhesive film to a side of the sheet;

placing a cellular structure against the adhesive film;

heating the entirety of the combination of sheet, film and structure to a temperature below the flow temperature of the film; and thereafter heating the combination to the flow temperature of the film to adhere the film to a side of a cellular structure, wherein the adhesive forms glue fillets of less than about 0.005 inches in width.

12. A light transmitting panel formed by the process of claim 1.

13. A light transmitting panel formed by the process of claim 7.

14. The process of claim 7 in which the adhesive film is one or more of heat sensitive and pressure sensitive.

15. The process of claim 7 in which the adhesive film has a thickness of less than about 0.006 inches.

16. The process of claim 7 in which the adhesive film is provided by applying an adhesive in liquid form to the sheet and at least partially curing or drying the liquid to form a film adhering to the sheet.

17. The process of claim 7 in which the adhesive film comprises an acrylic modified polyester.

* * * * *

UNITED STATES PATENT AND TRADEMARK OFFICE
CERTIFICATE OF CORRECTION

PATENT NO. : 6,500,516 B2
DATED : December 31, 2002
INVENTOR(S) : Emmanuelle Bourlier et al.

It is certified that error appears in the above-identified patent and that said Letters Patent is hereby corrected as shown below:

<u>Title page,</u>
Insert Item -- [73] Assignee: Panelite, L.L.C., New York, (US) --.
Insert Item -- [74] *Attorney, Agent, or Firm* - Fitzpatrick, Cella, Harper & Scinto --.

Signed and Sealed this

Twenty-third Day of May, 2006

JON W. DUDAS
*Director of the United States Patent and Trademark Office*